(12) United States Patent
Lambach et al.

(10) Patent No.: US 10,731,341 B2
(45) Date of Patent: *Aug. 4, 2020

(54) FLOOR ASSEMBLIES, METHODS FOR THEIR MANUFACTURE, AND THE USE OF SUCH ASSEMBLIES IN A BUILDING

(71) Applicant: COVESTRO LLC, Pittsburgh, PA (US)

(72) Inventors: James L. Lambach, McMurray, PA (US); David M. Baily, Upper Saint Clair, PA (US)

(73) Assignee: Covestro LLC, Pittsburgh, PA (US)

(*) Notice: Subject to any disclaimer, the term of this patent is extended or adjusted under 35 U.S.C. 154(b) by 1 day.

This patent is subject to a terminal disclaimer.

(21) Appl. No.: 16/180,712

(22) Filed: Nov. 5, 2018

(65) Prior Publication Data

US 2020/0141115 A1 May 7, 2020

(51) Int. Cl.
*E04B 5/02* (2006.01)
*E04B 1/76* (2006.01)
(Continued)

(52) U.S. Cl.
CPC ............... *E04B 5/02* (2013.01); *B32B 5/18* (2013.01); *B32B 15/046* (2013.01); *B32B 15/082* (2013.01); *B32B 15/095* (2013.01); *B32B 15/20* (2013.01); *E04B 1/7654* (2013.01); *E04C 3/02* (2013.01); *B32B 2266/0228* (2013.01); *B32B 2266/0278* (2013.01); *B32B 2307/304* (2013.01); *B32B 2419/00* (2013.01)

(58) Field of Classification Search
CPC ..... E04B 5/02; E04B 5/43; E04B 5/10; E04B 5/12; E04B 1/7654; E04B 1/7658; E04B 1/6804; E04B 1/7608; E04B 1/7666; E04F 15/041; E04F 15/18; E04C 2002/3488; E04C 2002/0434; E04C 2002/0452; E04C 2/34; E04C 2/284; E04D 13/1618; E04D 13/1625; E04D 13/1637
USPC ............ 52/126.1, 220.1, 234, 236.3, 506.01, 52/506.04, 506.06, 650.1, 650.3
See application file for complete search history.

(56) References Cited

U.S. PATENT DOCUMENTS 2,164,138 A * 6/1939 London ................. E04B 2/60
52/327
3,113,401 A 12/1963 Rose
(Continued)

FOREIGN PATENT DOCUMENTS

AT 413999 B 8/2006
CA 2197032 A1 8/1998
(Continued)

OTHER PUBLICATIONS

"Polyurethanes: Chemistry and Technology, Part II Technology," J. H. Saunders & K. C. Frisch, Interscience Publishers, 1964, p. 239.
(Continued)

*Primary Examiner* — Kyle J. Walraed-Sullivan
(74) *Attorney, Agent, or Firm* — Donald R. Palladino

(57) ABSTRACT

Prefabricated insulated floor assemblies, methods for manufacturing such assemblies, and use of these floor assemblies in a building are described. The assemblies include a sheathing panel, I-joists, and rigid foam insulation boards positioned in a cavity formed by the sheathing panel and the I-joists.

18 Claims, 8 Drawing Sheets

(51) Int. Cl.
*E04C 3/02* (2006.01)
*B32B 5/18* (2006.01)
*B32B 15/04* (2006.01)
*B32B 15/082* (2006.01)
*B32B 15/095* (2006.01)
*B32B 15/20* (2006.01)

(56) References Cited

U.S. PATENT DOCUMENTS

| | | | |
|---|---|---|---|
| 3,921,355 | A | 11/1975 | Pennecot |
| 4,435,928 | A | 3/1984 | Huling |
| 4,472,920 | A * | 9/1984 | Simpson .................. E04B 1/14 52/222 |
| 4,604,846 | A * | 8/1986 | Ekstrom .............. E04B 1/7608 411/480 |
| 4,700,521 | A | 10/1987 | Cover |
| 5,079,885 | A | 1/1992 | Dettbarn |
| 5,119,612 | A | 6/1992 | Taylor et al. |
| 5,165,212 | A | 11/1992 | Arnold |
| 5,353,560 | A | 10/1994 | Heydon |
| 6,729,094 | B1 * | 5/2004 | Spencer .................. E04B 5/10 52/334 |
| 6,775,916 | B2 | 8/2004 | Sparkes |
| 7,033,116 | B1 | 4/2006 | Ward |
| 7,827,763 | B2 | 11/2010 | Brown et al. |
| 8,046,969 | B2 | 11/2011 | Dagher et al. |
| 8,122,681 | B2 | 2/2012 | Wrass et al. |
| 8,141,313 | B2 | 3/2012 | Dagher et al. |
| 8,635,828 | B2 | 1/2014 | Bahnmiller |
| 8,640,412 | B2 | 2/2014 | Kato |
| 8,661,770 | B2 | 3/2014 | Wrass et al. |
| 8,925,269 | B1 | 1/2015 | Beaudin |
| 9,175,476 | B2 | 11/2015 | Wrass et al. |
| 9,453,332 | B2 | 9/2016 | ter Huurne |
| 9,689,165 | B2 | 6/2017 | Wrass et al. |
| 2006/0096205 | A1 * | 5/2006 | Griffin .................. E04C 2/296 52/309.4 |
| 2007/0193161 | A1 * | 8/2007 | Tokuno ................ E01D 19/125 52/318 |
| 2008/0104918 | A1 | 5/2008 | Gleeson et al. |
| 2008/0245399 | A1 | 10/2008 | DeLiddo |
| 2010/0300037 | A1 | 12/2010 | Turner et al. |
| 2012/0151869 | A1 * | 6/2012 | Miller .................. E04B 1/7666 52/650.1 |
| 2015/0093535 | A1 | 4/2015 | Lambach et al. |
| 2015/0354220 | A1 | 12/2015 | Nandi et al. |

FOREIGN PATENT DOCUMENTS

| | | |
|---|---|---|
| CA | 2461143 A1 | 9/2005 |
| DE | 20016828 U1 | 4/2001 |
| DE | 202004020808 U1 | 2/2006 |
| EP | 0006756 A2 | 1/1980 |
| EP | 0294079 A1 | 12/1988 |
| FR | 2636995 A1 | 3/1990 |
| GB | 2082645 A | 3/1982 |
| GB | 2440803 A | 2/2008 |
| GB | 2480994 A | 12/2011 |
| JP | 09100584 A | 4/1997 |
| JP | 2003160981 A | 6/2003 |
| JP | 2007056468 A | 3/2007 |
| WO | 9530808 A1 | 11/1995 |
| WO | WO 0045098 A1 | 8/2000 |
| WO | 2011156460 A2 | 12/2011 |

OTHER PUBLICATIONS

S. C. Mantell et al.; "Manufactured Panelized Roof System for Residential Buildings"; 2008 ACEEE Summer Study on Energy Efficiency in Buildings.

"Reflective Technologies in the Thermal Envelope" by Yarbrough and Hall, Interface (Feb. 2016).

"Roof Framing with Wood I-Joists", Eck, JCL (Jan. 1997).

James L. Lambach et al., U.S. Appl. No. 16/180,632, filed Nov. 5, 2018, entitled Roof Assemblies With Inset Solar Panels, Methods for Their Manufacture, and the Use of Such Assemblies in a Building.

James L. Lambach et al., U.S. Appl. No. 16/180,672, filed Nov. 5, 2018, entitled Buildings With Continous Insulation Bridging a Roof Assembly and a Floor Assembly.

James L. Lambach et al., U.S. Appl. No. 16/180,589, filed Nov. 5, 2018, entitled Roof Assemblies, Methods for Their Manufacture, and the Use of Such Assemblies in a Building.

https://www.merriam-webster.com/dictionary/correspond (retrieved on Feb. 4, 2020).

International Search Report and Written Opinion of the International Searching Authority, PCT/US2019/059591, dated Apr. 30, 2020.

* cited by examiner

FLOOR ASSEMBLIES, METHODS FOR THEIR MANUFACTURE, AND THE USE OF SUCH ASSEMBLIES IN A BUILDING

FIELD

The present specification relates to prefabricated insulated floor assemblies that utilize rigid foam insulation boards. The present specification also relates to methods for manufacturing such assemblies, as well as to the use of such assemblies in a building.

BACKGROUND

Slab-on-grade, basement, crawlspace, and raised pier are the four types of foundation approaches widely used in building construction. The basement, crawlspace and pier approaches all serve to elevate the first floor of the structure to an elevation that is at- or above-grade. In these cases, the insulation boundary is often located at the underside of the floor system. Since this under-floor insulation is at- or above-grade it is protected from water intrusion, and moisture is not a significant concern. Locating the thermal boundary at the floor deck also significantly reduces the volume of space that needs to be conditioned, requiring less energy overall to heat and cool the house. Therefore, insulated floors exist, with the predominant insulation material being fiberglass batts applied in the cavity between floor joists at the job site.

Such insulated floor structures are not, however, without drawbacks. First, installation with fiberglass batts between floor joists at the jobsite is very labor intensive. Second, fiberglass batt offers no air or vapor barrier layer, thus limiting building designs. Third, fiberglass batt has no inherent rigidity and can sag away from the subfloor over time, such sagging also leading to compression of the fiberglass batt, which results in a loss of thermal insulation performance ("R-value"). Finally, fiberglass batting offers no structural rigidity to enhance the structural performance of the floor structure.

As a result, it would be desirable to provide insulated floor structures that are fabricated away from the job site, are constructed so that the insulation is and will remain in contact with the subfloor, will not exhibit a deterioration in R-value over time, will contribute to the structural performance, including rollover strength, of the floor system, and is air and vapor impermeable to reduce the likelihood for condensation of water vapor across the temperature differential of the thermal envelope.

The present invention was made in view of the foregoing.

SUMMARY

In certain respects, the specification relates to prefabricated insulated floor assemblies. These assemblies comprise: (a) a sheathing panel comprising: (1) an upper surface, and (2) a lower surface; (b) a plurality of I-joists positioned in a spaced-apart and generally parallel relationship to each other, the I-joists comprising: (1) an upper flange, (2) a lower flange, and (3) a web extending between the upper flange and the lower flange, wherein the lower surface of the sheathing panel abuts an upper surface of the upper flange of the I-joists so that the sheathing panel and the I-joists define a cavity; (c) a generally planar first rigid foam insulation board comprising: (1) an upper surface, (2) a lower surface, (3) a first side, and (4) a second side that is opposite of the first side, wherein first rigid foam insulation board is positioned in the cavity such that: (1) the upper surface of the first rigid foam insulation board abuts the lower surface of the sheathing panel, (2) an outer edge of the first side of the first rigid foam insulation board faces an inner side of the upper flange of a first I-joist, and (3) an outer edge of the second side of the first rigid foam insulation board faces an inner side of the upper flange of a second I-joist; and (d) a generally planar second rigid foam insulation board comprising: (1) an upper surface, (2) a lower surface, (3) a first side, and (4) a second side that is opposite of the first side, wherein the second rigid foam insulation board is positioned in the cavity such that: (1) the upper surface of the second rigid foam insulation board faces the lower surface of the first rigid foam insulation board, (2) the lower surface of the second rigid foam insulation board faces the upper surface of the lower flange of the first I-joist at the first side of the second rigid foam insulation board, (3) the lower surface of the second rigid foam insulation board faces the upper surface of the lower flange of the second I-joist at the second side of the second rigid foam insulation board, (4) an outer edge of the first side of the second rigid foam insulation board faces the web of the first I-joist, and (5) an outer edge of the second side of the second rigid foam insulation board faces the web of the second I-joist.

In other respects, the present specification is directed to methods for making floor assemblies. These methods comprise: (a) positioning an assembly on a support, the assembly comprising: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joist; (iii) the first rigid foam insulation board is positioned between the first I-joist and the second I-joist such that (A) an outer edge of the first side of the first rigid foam insulation board faces an inner side of the upper flange of the first I-joist, and (B) an outer edge of the second side of the first rigid foam insulation board faces an inner side of the upper flange of the second I-joist; and (iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of the first I-joist at the first side of the second rigid foam insulation board, (C) the lower surface of the second rigid foam insulation board faces the upper surface of the lower flange of the second I-joist at the second side of the second rigid foam insulation board, (D) an outer edge of the first side of the second rigid foam insulation board faces the web of the first I-joist, and (E) an outer edge of the second side of the second rigid foam insulation board faces the web of the second I-joist; (b) squaring the assembly; and (c) attaching a sheathing panel to the upper surface of the upper flange of the first I-joist and the second I-joist of the squared assembly so that the upper surface of the first rigid foam insulation board abuts the lower surface of the sheathing panel.

The present specification also relates, among other things, buildings comprising such roof and/or floor assemblies described herein.

BRIEF DESCRIPTION OF THE DRAWINGS

Various features and characteristics of the inventions described in this specification may be better understood by reference to the accompanying figures, in which:

FIG. 1b is a detailed elevational view of a portion of the floor assembly of FIG. 1a;

The reader will appreciate the foregoing features and characteristics, as well as others, upon considering the following detailed description of the inventions according to this specification.

DETAILED DESCRIPTION

The present specification is directed to floor assemblies, methods for their manufacture, and to the use of such assemblies in a building. In certain implementations, the assemblies are "prefabricated" which means that the insulated assembly is manufactured at a facility remote from a building construction site. As such, the amount of work required to install the assembly at the building construction site is significantly reduced relative to floor assemblies that are fabricated at the building construction site, thereby reducing installation costs.

Figure 1A:
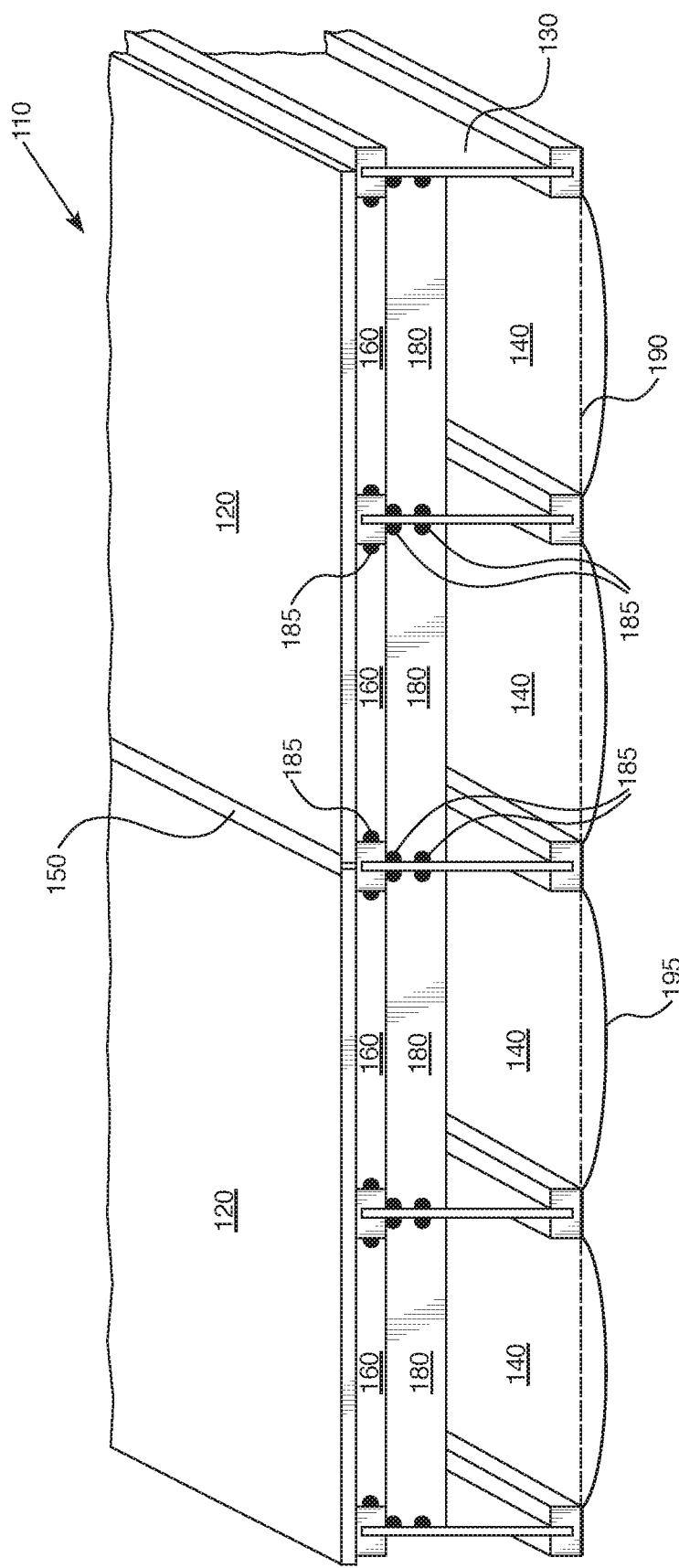
FIG. 1a is a perspective view of a floor assembly according to the present specification.
Figure 1B:
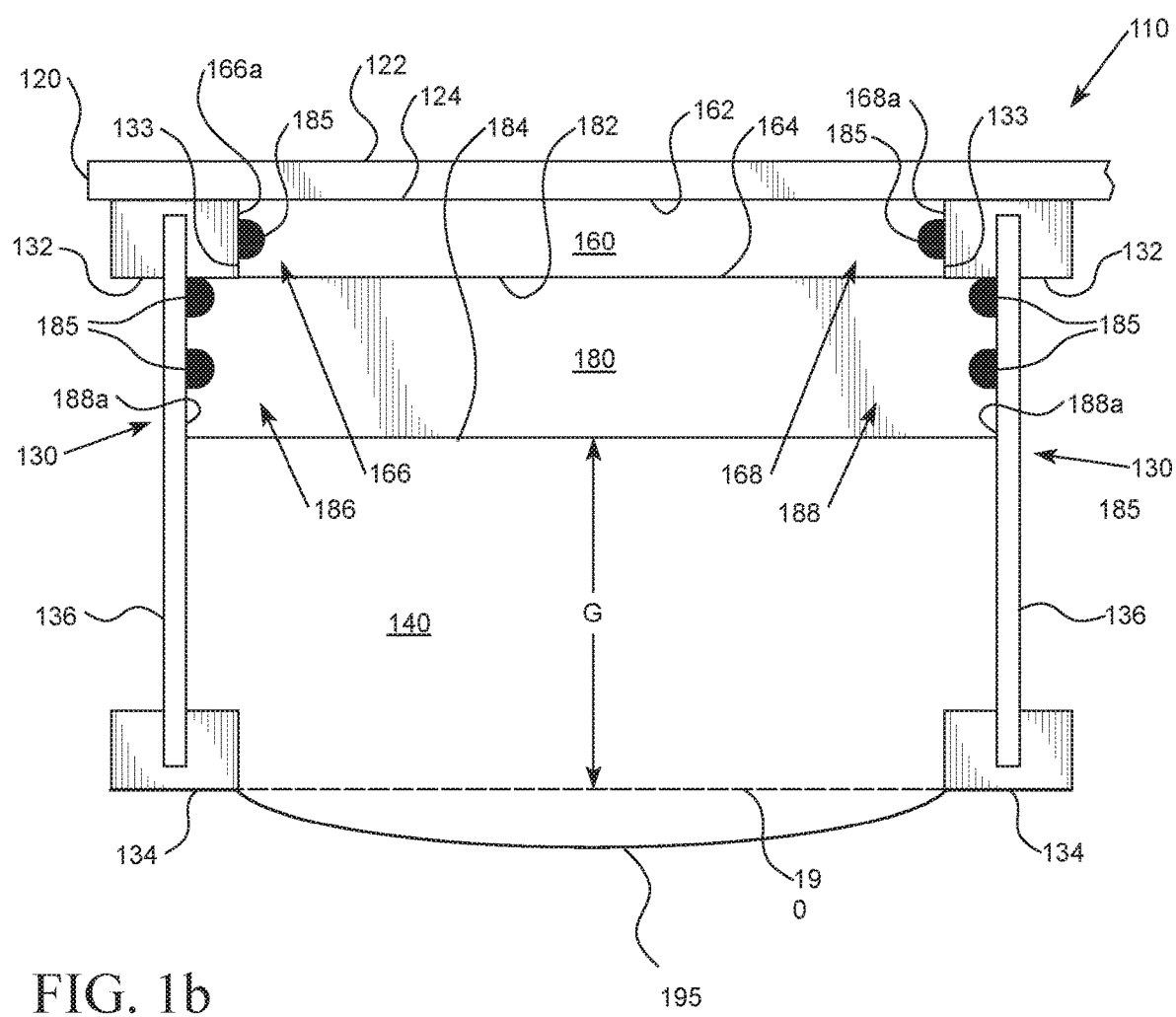

Referring to FIGS. 1a and 1b, a floor assembly 110 comprises a sheathing panel 120. The sheathing panel 120 is of a substantially planar (flat) configuration and is constructed of, for example, oriented strand board ("OSB"), plywood, another type of wood or even a metallic material or composite material, if desired. In some implementations, the sheathing panel 120 may comprise a polymeric diphenylmethane diisocyanate impregnated OSB, such as is commercially available as AdvanTech® Flooring. The sheathing panel 120 has an upper surface 122 and a lower surface 124. In some implementations, such as that illustrated in FIGS. 1a and 1b, the sheathing panel 120 has a thickness of ½ inch to ¾ inch, a width of 4 to 10 feet, and length of 15 to 25 feet. As used herein, orientational terms, such as "upper", "lower", "outer" and "inner" refer to orientation during normal use of the floor assembly.

The floor assembly 110 also includes a plurality of I-joists 130. These joists are elongated beams that support a floor. As is apparent, the I-joists 130 are positioned in a spaced-apart and generally parallel relationship to each other. In some implementations, the spacing between each I-joist is 8 to 24 inches on center, such as 12 to 16 inches on center. Each I-joist comprises (1) an upper flange 132, (2) a lower flange 134, and (3) a web 136 extending between the upper flange 132 and the lower flange 134. The upper flange 132 and the lower flange 134 are often constructed of wood, such as pine lumber and laminated veneer lumber ("LVL"), though other types of wood are also possible, as are metallic and composite materials. In some implementations, the I-joists are constructed using materials that render the I-joists fire retardant.

In some embodiments, the upper flange 132 and the lower flange 134 of the plurality of I-joists 130 has substantially the same width and height dimension. For example, in some cases, upper flange 132 and lower flange 134 have a height of at least 0.5 inch, in some cases, at least 1 inch, such as 1 to 2 inches or 1 to 1½ inches. In some cases, upper flange 132 and lower flange 134 have a width of at least 2 inches, such as 2 to 4 inches or 2½ to 3½ inches. The web 136 is often constructed of OSB or plywood, though another type of wood or even a metallic material or composite material could be used if desired. The web 136, in some cases, can be dimensioned so that the I-joist has a total height of 9 to 16 inches, such as 9½ inches to 11⅞, 14, or 16 inches.

As is apparent, in the floor assembly 110 depicted in FIGS. 1a and 1b, the lower surface 124 of the sheathing panel 120 abuts an upper surface of the upper flange 132 of the I-joists 130 so that the sheathing panel 120 and the I-joists 130 define cavities 140. In some embodiments, the sheathing panel 120 is secured to the upper surface of the upper flange 132 of the I-joists 130 with adhesive, mechanical fasteners, or a combination thereof. Suitable mechanical fasteners include nails, nail plates, screws, staples, bolts, or rivets, or a combination of any thereof. Attachment adhesives can comprise a construction adhesive that is compatible with the adjoining materials. Suitable adhesives include latex-based adhesives, reactive hot melts, polyester adhesives, polyamide adhesives, acrylic adhesives, one-component epoxy-based adhesives, one-component polyurethane-based adhesives and two-component polyurethane-based adhesives. For example, an adhesive used to attach a sheathing panel to an I-joist can comprise a foam material. Further, as shown in FIG. 1a, tape 150 can be used to seal gaps between adjacent sheathing panels.

Positioned within each cavity 140 is a generally planar first rigid foam insulation board 160. The first rigid foam insulation board comprises: (1) an upper surface 162, (2) a lower surface 164, (3) a first side 166, and (4) a second side 168 that is opposite of the first side. Moreover, the first rigid foam insulation board 160 is positioned in the cavity 140 such that: (1) the upper surface 162 of the first rigid foam insulation board 160 abuts the lower surface 124 of the sheathing panel 120, (2) an outer edge 166a of the first side 166 of the first rigid foam insulation board 160 faces an inner side 133 of the upper flange 132 of a first I-joist 130, and (3) an outer edge 168a of the second side 168 of the first rigid foam insulation board 160 faces an inner side 133 of the upper flange 132 of a second I-joist 130.

As indicated, and as is depicted in FIGS. 1a and 1b, the upper surface 162 of the first rigid foam insulation board 160 abuts the lower surface 124 of the sheathing panel 120 so that first rigid foam insulation board 160 and the sheathing panel 120 are not in a spaced-apart relationship relative to each other.

As used in this specification, the term "rigid foam insulation board" refers to boards comprising rigid foam, such as, for example, polyisocyanurate (sometimes referred to herein as "polyiso") foam boards, expanded polystyrene foam boards, and extruded polystyrene foam boards. As used herein, "foam" refers to a substance that is formed by trapping pockets of gas in a liquid or solid. In certain embodiments, the foams described in this specification are "closed-cell" foams. The term "closed-cell foam", as used in this specification, means that the foam has a closed cell content of at least 80%, sometimes at least 90%, when measured according to ASTM D6226-15, which is incorporated herein by reference. As indicated, the foams described in this specification are "rigid" foams. The term "rigid foam" refers to a foam having a ratio of compressive strength to tensile strength of at least 0.5:1, elongation of less than 10%, and a low recovery rate from distortion and a low elastic limit, as described in "Polyurethanes: Chemistry and Technology, Part II Technology," J. H. Saunders & K. C. Frisch, Interscience Publishers, 1964, page 239, which is incorporated herein by reference. The term "board", as used in this specification, refers to a solid, relatively thin and flat slab of material, which in some cases has a rectangular or square shape.

In some embodiments, the first rigid foam insulation board 160 comprises a facer material on the upper face and/or the lower face of the foam layer. In some embodiments, for example, the first rigid foam insulation board 160 may comprise a polyisocyanurate foam layer and a facer material attached to an upper face and/or a lower face of the polyisocyanurate foam layer. A polyisocyanurate board or other type of foam board can comprise a facer material attached to just one face, either the upper face or the lower face, of a polyisocyanurate foam layer or other core foam layer (e.g., expanded polystyrene or extruded polystyrene).

Polyisocyanurate foam boards and other types of foam boards generally comprise a facer material attached to and substantially covering both sides (the upper and lower faces) of a polyisocyanurate foam layer or other core layer. For example, facer materials can comprise glass mats filled with recycled cardpanel and colored with carbon black. Facer materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.). If a polyiso foam board or other type of foam board comprises facer materials on both the upper and lower faces of the polyisocyanurate foam layer or other core layer, then the facer material on the upper face may be the same as or may be different than the facer material on the lower face. The facer material should meet the requirements as described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with IRC 703.2, which are each incorporated by reference into this specification. For embodiments in which the first rigid foam insulation board comprises a polyiso foam board, the foam board may meet the requirements of ASTM C1289-15: Standard Specification for Faced Rigid Cellular Polyisocyanurate Thermal Insulation Panel, which is incorporated by reference into this specification.

In some implementations, the first rigid foam insulation board 160 has a thickness corresponding to the height of side 133 of upper flange 132 of the I-joists 130. As a result, like the heights for the upper flange 132 mentioned earlier, the first rigid foam insulation board 160 has, in certain implementations, a thickness of at least 0.5 inch, in some cases, at least 1 inch, such as 1 to 2 inches or 1 to 1½ inches. In certain of these implementations, the first rigid foam insulation board 160 comprises a polyisocyanurate foam layer and an aluminum foil or coated glass facer adhered to each side of the polyisocyanurate foam layer.

As indicated, an outer edge 166a of the first side 166 of the first rigid foam insulation board 160 faces an inner side 133 of the upper flange 132 of a first I-joist 130, and an outer edge 168a of the second side 168 of the first rigid foam insulation board 160 faces an inner side 133 of the upper flange 132 of a second I-joist 130. In some implementations, such as the implementation depicted in FIGS. 1a and 1b, edge 166a of the first side 166 of the first rigid foam insulation board 160 abuts the inner side 133 of the upper flange 132 of the first I-joist 130 and edge 168a of the second side 168 of the first rigid foam insulation board 168 abuts the inner side 133 of the upper flange 132 of the second I-joist 130, so that edges 166a and 166b are not in a spaced-apart relationship relative to the inner side 133 of the upper flange 132 of the first I-joist 130 and the inner side 133 of the upper flange 132 of the second I-joist 130, respectively.

Also positioned within each cavity 140 is a generally planar second rigid foam insulation board 180. The second rigid foam insulation board 180 comprises: (1) an upper surface 182, (2) a lower surface 184, (3) a first side 186, and (4) a second side 188 that is opposite of the first side. Moreover, the second rigid foam insulation board 180 is positioned in the cavity 140 such that: (1) the upper surface 182 of the second rigid foam insulation board 180 faces the lower surface 164 of the first rigid foam insulation board 160. In some embodiments, such as is depicted in FIGS. 1a and 1b, the upper surface 182 of the second rigid foam insulation board 180 abuts the lower surface 164 of the first rigid foam insulation board 160 so that first rigid foam insulation board 160 and second rigid foam insulation board 180 are not in a spaced-apart relationship relative to each other.

Referring still to FIGS. 1a and 1b, it is evident that the lower surface 184 of the second rigid foam insulation board 180 faces the upper surface of the lower flange 134 of a first I-joist 130 at the first side 186 of the second rigid foam insulation board 180 and the lower surface 184 of the second rigid foam insulation board 180 faces the upper surface of the lower flange 134 of a second I-joist 130 at the second side 188 of the second rigid foam insulation board 180. In some embodiments, such as is depicted in FIGS. 1a and 1b, both (i) the lower surface 184 of the second rigid foam insulation board 180 faces the upper surface of the lower flange 134 of a first I-joist 130 at the first side 186 of the second rigid foam insulation board 180 in a spaced-apart relationship relative to each other, and (ii) the lower surface 184 of the second rigid foam insulation board 180 faces the upper surface of the lower flange 134 of a second I-joist 130 at the second side 188 of the second rigid insulation board in a spaced-apart relationship relative to each other. As such, a gap G may be formed between the lower surface 184 of the second rigid foam insulation board and the lower surface of the lower flanges 134 of I-joists 130.

As is also apparent, an outer edge 186a of the second rigid foam insulation board 180 faces the web 136 of the first I-joist 130 at first side 186 and an outer edge 188a of the second rigid foam insulation board 188 faces the web 136 of the second I-joist 130 at second side 188. In some implementations, such as the implementation depicted in FIGS. 1*a* and 1*b*, outer edge 186*a* of the first side 186 of the second rigid foam insulation board 180 abuts the web 136 of the first I-joist 130 and outer edge 188*a* of the second side 188 of the second rigid foam insulation board 188 abuts the web 136 of the second I-joist 130, so that outer edges 186*a* and 186*b* are not in a spaced-apart relationship relative to web 136 of the first I-joist 130 and web 136 of the second I-joist 130, respectively.

In some implementations, the second rigid foam insulation board 180 has a thickness of at least ½ inch, such as ½ inch, 1 inch, 1½ inch, 2 inches, 2½ inches, 3 inches, 3½ inches, or 4 inches, in some cases a thickness of ½ to 4 inches or 2 to 4 inches, and comprises a polyisocyanurate foam layer and an aluminum foil, coated glass facer, or glass fiber reinforced foil (i.e., aluminum foil) facer material adhered to each side of the polyisocyanurate foam layer.

In some implementations, one or more additional insulation layers may be included in the roof assemblies of this specification. For example, it may be desirable to include additional rigid foam insulation boards, wherein an upper surface of such additional rigid foam insulation board faces the lower surface 184 of the second rigid foam insulation board 180. One example of such an implementation is illustrated in FIG. 2*d*, discussed below. In another example, a hybrid floor assembly may be employed that combines rigid foam insulation, such as polyisocyanurate foam insulation, boards having an air and vapor impermeable facer with permeable fiberglass batt insulation. One particular example of such an arrangement is depicted in FIG. 2*e*, which is described below. Such a hybrid assembly may, for example, provide for improved sound barrier performance. However, when air and vapor permeable insulations, such as fiberglass, are employed, the potential exists for water vapor to condense within the matrix of the permeable insulation. If a mixed permeable, impermeable, insulation approach is used, the designer will typically use a standard such as ASHRAE 160 "Criteria for Moisture-Control Design Analysis in Buildings" to minimize the potential for condensation to occur in the thermal envelope of the building.

In some implementations, an adhesive 185 is disposed in an aperture formed between one or both of the first rigid foam insulation board 160 and an inner side 133 of an I-joist 130, such as between one or both of edges 166*a* and 168*a* of first rigid foam insulation board 160 and inner side 133 of first I-joist 130 and inner side 133 of second I-joist 130 and between one or both of edges 186*a* and 188*a* of second rigid foam insulation board 180 and web 136 of first I-joist 130 and web 136 of the second I-joist 130. In addition, although not illustrated in FIGS. 1*a* and 1*b*, adhesive may be applied between the upper surface 162 of rigid foam insulation panel 160 and the lower surface 124 of sheathing panel 120. Suitable adhesives include a construction adhesive that is compatible with the adjoining materials, such as the adhesives mentioned earlier. For example, an adhesive used to attach a sheathing panel to an I-joist can comprise a foam material.

In addition, if desired, intermittent blocking or strapping 190 may be attached to the lower flange 134 of I-joists 130, such as at the lower surface of lower flange 134, to provide additional protection against rollover of the assembly 110. In addition to, or in lieu of, blocking or strapping 190, mechanical attachment devices that are specifically designed and sold to stop rollover, such as those sold by Simpson Strong Tie or MiTek/USP or others, can be used. A vapor barrier film 195 may also be included that spans cavities 140 and is attached to the lower surface of the lower flange 134 of the I-joists 130.

In certain implementation of the floor assemblies of this specification, the second rigid foam insulation board 180 is designed such that, according to the 2018 International Residential Code® ("IRC") Section 2603.9, compliance with the requirements of IRC Sections 2603.4 through 2603.7 is not required. As will be appreciated based on the IRC, compliance with the requirements of IRC Sections 2603.4 through 2603.7 is not required (allowing the foam plastic to remain exposed) if the end-use assembly is approved in a large scale fire test, such as one of the following: NFPA 286 (using the defined acceptance criteria from IBC Sect 803.1.1.1), FM 4880, UL1040, or UL 1715 in which the testing is on the actual end-use configuration and is performed on the finished manufactured foam plastic assembly in the maximum thickness intended for use.

In addition, in certain implementations of the floor assemblies of this specification, the combined thermal insulating value of the first rigid foam insulation board and the second rigid foam insulation board is at least R-13, in some cases, at least R-19, R-30, or R-38, determined per ASTM C 518-17 in accordance with ASTM C-1289-18.

Various exemplary implementations of the floor assemblies of this specification will now be described with reference to FIGS. 2*a*-2*e*. The selection of the particular implementation may be dictated by the climate zone in which the building is located in which the floor assembly is intended to be used as well as structural considerations relating to the building design itself. The implementations may be selected using rigid foam insulation boards that are readily available and are not difficult to manufacture. Such readily available rigid foam insulation boards have a thickness ranging from 1 inch to 4 inch, including thicknesses of 1 inch, 1½ inch, 2 inch, 2½ inch, 3 inch, 3½ inch, and 4 inch.

Figure 2A:
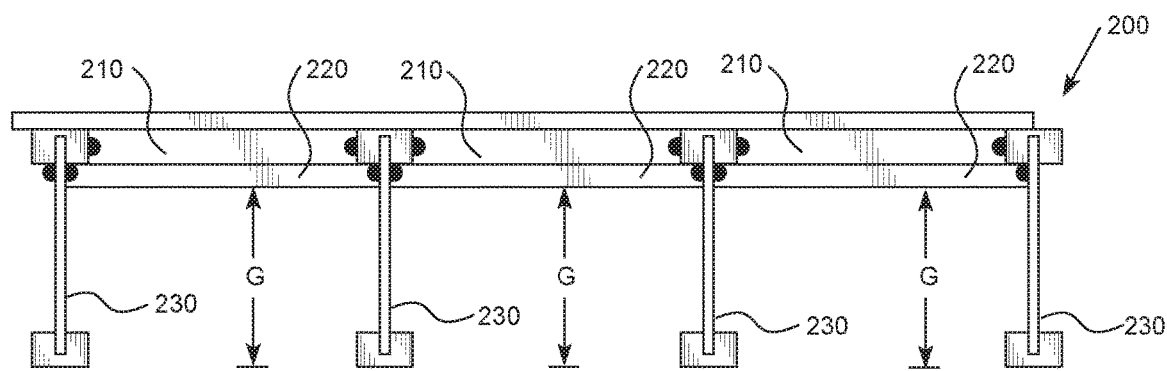
FIGS. 2a-2e are elevational views of floor assemblies according to the present specification.

For example, FIG. 2*a* is an exemplary implementation of a floor assembly 200 that might be employed for a building located in United States Climate Zone 1 or 2, as identified by the United States Department of Energy, in which the use of I-joists 230 having a total height of 9½ inches are illustrated (which may be selected based on structural considerations relating to the building design). Structural considerations could also dictate the use of I-joists 230 having a total height of 117/8 inches, 14 inches or 16 inches, which would result in a gap G having a height that is significantly greater than in the implementation depicted in FIG. 2*a*. In this assembly 200, first rigid foam insulation board 210 may have a thickness sufficient to provide an insulation value of R-9.5 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable first rigid foam insulation board 210 that may be employed in such an implementation is 1½" thick Xci 286 panels, commercially available from Hunter Panels, Portland, Me. Further, in the implementation depicted in FIG. 2*a*, second rigid foam insulation board 210 may have a thickness sufficient to provide an insulation value of R-6.3 or greater (determined per ASTM C 518-17 in accordance with ASTM C-1289-18), such as can be the case with a 1 inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 1" thick Xci 286 panels, commercially available from Hunter Panels, Portland, Me. By employing over 2" of polyisocyanurate rigid foam insulation board having a glass fiber reinforced facer adhered to the foam layer on at least the lower side thereof, in some cases on both the upper side and lower side thereof, the need for a separate thermal barrier layer covering the lower flange of the I-joists can be avoided, if desired.

Figure 2B:
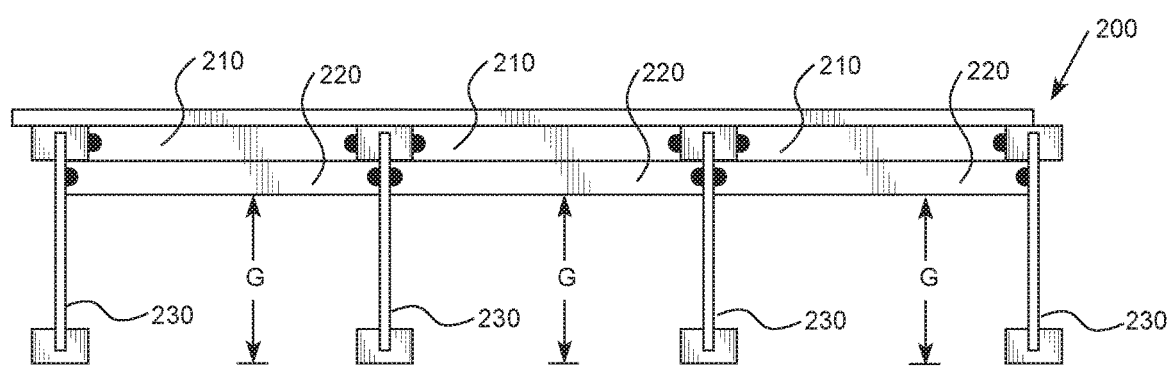

FIG. 2b is another exemplary implementation of a floor assembly 200 of this specification. This particular implementation of such a floor assembly 200 might be employed for a building located in United States Climate Zone 3 or 4 (except 4 Marine), as identified by the United States Department of Energy, in which structural considerations relating to the building design dictate the use of I-joists 230 having a total height of 9½ inches. Structural considerations could also dictate the use of I-joists 230 having a total height of 117/8 inches, 14 inches or 16 inches, which would result in a gap G having a height that is significantly greater than in the implementation depicted in FIG. 2b. In this assembly 200, first rigid foam insulation board 210 may have a thickness sufficient to provide an insulation value of R-9.5 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 1½" thick Xci 286 Foil panels, commercially available from Hunter Panels, Portland, Me. Further, in the implementation depicted in FIG. 2b, second rigid foam insulation board 220 may also have a thickness sufficient to provide an insulation value of R-9.5 or greater (determined per ASTM C 518-17 in accordance with ASTM C-1289-18), such as can be the case with a 1½ inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 1½" thick Xci 286 Foil panels, commercially available from Hunter Panels, Portland, Me. By employing over 2" of polyisocyanurate rigid foam insulation board having a glass fiber reinforced facer adhered to the foam layer on at least the lower side thereof, in some cases on both the upper side and lower side thereof, the need for a separate thermal barrier layer covering the lower flange of the I-joists can be avoided, if desired.

Figure 2C:
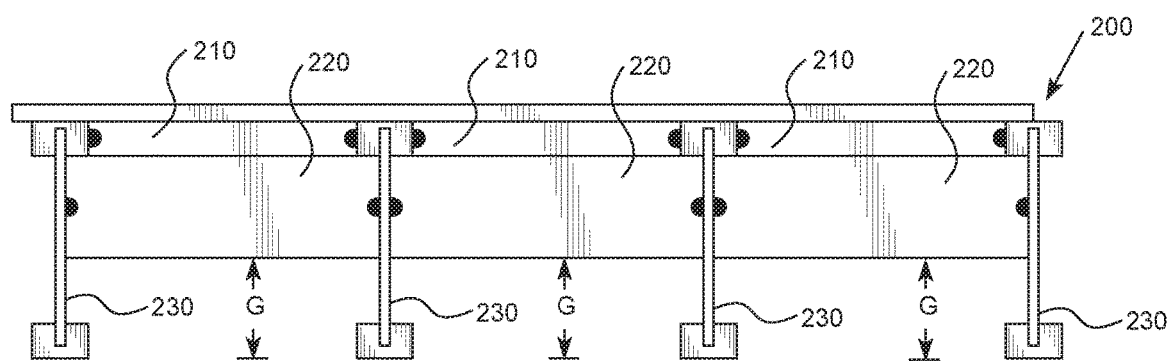
Figure 2D:
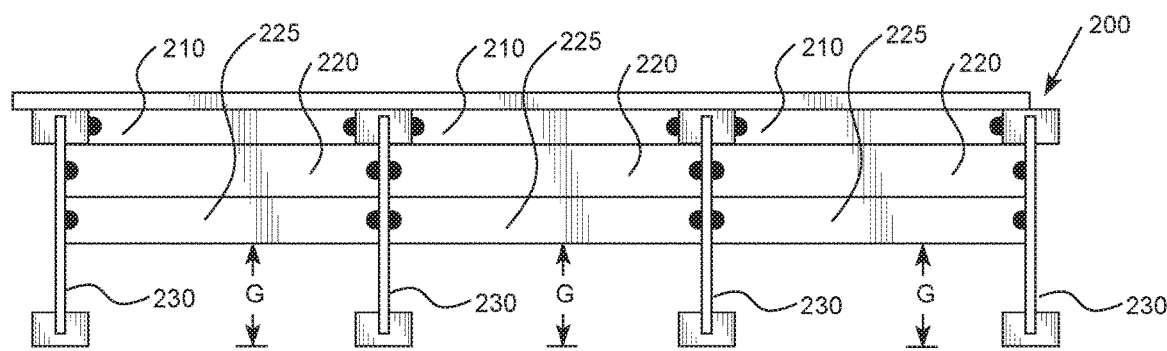
Figure 2E:
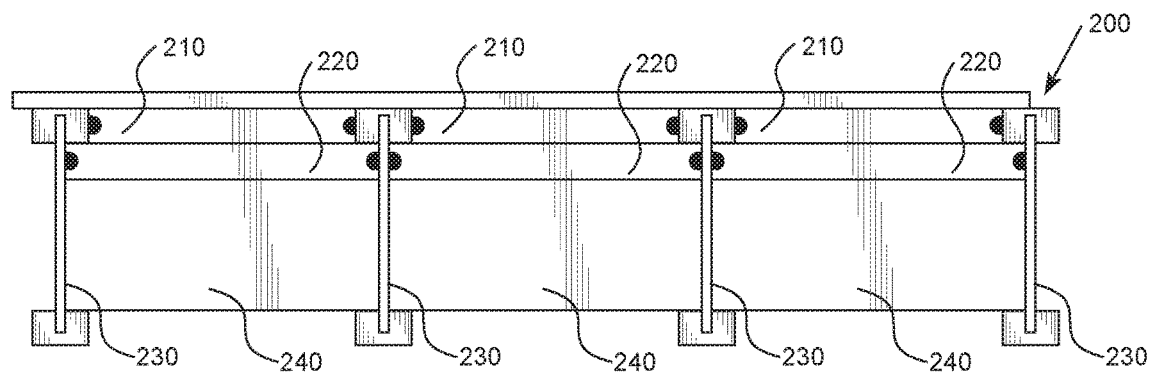

Now referring to FIG. 2c, there is depicted an exemplary implementation of a floor assembly 200 that might be employed for a building located in United States Climate Zone 4 Marine, 5 or 6, as identified by the United States Department of Energy, in which the use of I-joists 230 having a total height of 9½ inches are illustrated (which may be selected based on structural considerations relating to the building design). Structural considerations could also dictate the use of I-joists 230 having a total height of 117/8 inches, 14 inches or 16 inches, which would result in a gap G having a height that is significantly greater than in the implementation depicted in FIG. 2c. In this assembly 200, first rigid foam insulation board 210 may have a thickness sufficient to provide an insulation value of R-9.5 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 1½" thick Xci Foil panels, commercially available from Hunter Panels, Portland, Me. Further, in the implementation depicted in FIG. 2c, second rigid foam insulation board 220 may have a thickness sufficient to provide an insulation value of R-22 or greater (determined per ASTM C 518-17 in accordance with ASTM C-1289-18), such as can be the case with a 3½ inch thick rigid polyisocyanurate foam board. It may be particularly desirable to employ such a second rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 3½" thick Xci 286 Foil panels, commercially available from Hunter Panels, Portland, Me. By employing over 2" of polyisocyanurate rigid foam insulation board having a glass fiber reinforced facer adhered to the foam layer on at least the lower side thereof, in some cases on both the upper side and lower side thereof, the need for a separate thermal barrier layer covering the lower flange of the I-joists can be avoided, if desired.

FIG. 2d is another exemplary implementation of a floor assembly 200 that might be employed for a building located in United States Climate Zones 7 or 8, as identified by the United States Department of Energy in which structural considerations relating to the building design dictate the use of I-joists 230 having a total height of 9½ inches. Structural considerations could also dictate the use of I-joists 230 having a total height of 117/8 inches, 14 inches or 16 inches, which would result in a gap G having a height that is significantly greater than in the implementation depicted in FIG. 2d. In this assembly 200, first rigid foam insulation board 210 may have a thickness sufficient to provide an insulation value of R-9.5 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 1½" thick Xci Foil panels, commercially available from Hunter Panels, Portland, Me. Further, in the implementation depicted in FIG. 2c, second rigid foam insulation board 220 may have a thickness sufficient to provide an insulation value of R-17 or greater (determined per ASTM C 518-17 in accordance with ASTM C-1289-18), such as can be the case with a 2½ inch thick rigid polyisocyanurate foam board. It may be particularly desirable to employ such a second rigid foam insulation board 220 that comprises a weather impermeable facer material, such as a weather impermeable foil (e.g. aluminum foil) or coated glass facer, adhered to the foam layer on at least the upper side thereof, in some cases on both the upper side and lower side thereof. One specific example of a suitable first rigid foam insulation board 210 that may be employed in such an implementation is 2½" thick Xci Foil panels, commercially available from Hunter Panels, Portland, Me. In this particular implementation, third rigid foam insulation board 225 may have a thickness sufficient to provide an insulation value of R-13 or greater (determined per ASTM C 518-17 in accordance with ASTM C-1289-18), such as can be the case with a 2 inch thick rigid polyisocyanurate foam board. It may be particularly desirable to employ such a third rigid foam insulation board 225 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 225 that may be employed in such an implementation is 2" thick Xci 286 Foil panels, commercially available from Hunter Panels, Portland, Me. By employing 2" of polyisocyanurate rigid foam insulation board having a glass fiber reinforced facer adhered to the foam layer on at least the lower side thereof, in some cases on both the upper side and lower side thereof, the need for a separate thermal barrier layer covering the lower flange of the I-joists can be avoided, if desired.

FIG. 2e is another exemplary implementation of a roof assembly 200 that might be employed for a building located in United States Climate Zone 7 or 8 (as identified by the United States Department of Energy). In this case, the use of I-joists 230 having a total height of 117/8 inches is illustrated, which may be selected due to structural considerations relating to the building design. In this assembly 200, first rigid foam insulation board 210 may have a thickness sufficient to provide an insulation value of R-10 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 210 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 210 that may be employed in such an implementation is 1½" thick Xci 286 panels, commercially available from Hunter Panels, Portland, Me. Further, in the implementation depicted in FIG. 2e, second rigid foam insulation board 220 may have also have a thickness sufficient to provide an insulation value of R-10 or greater (determined per ASTM C 518-17 in accordance with ASTM C-1289-18), such as can be the case with a 1½ inch thick rigid polyisocyanurate foam board. It may be particularly desirable to employ such a first rigid foam insulation board 220 that is suitable for interior use, such as can be the case with polyisocyanurate foam boards having a glass fiber reinforced facer adhered to the foam layer on at least the lower side thereof, in some cases on both the upper side and lower side thereof. One specific example of a suitable second rigid foam insulation board 220 that may be employed in such an implementation is 1½" thick Xci 286 panels, commercially available from Hunter Panels, Portland, Me. Further, the hybrid assembly 200 depicted in FIG. 2e also includes insulation layer 240 that has an upper surface abutting the lower surface of second rigid foam insulation board 220 and outer edges that face the web of I-joists 230. In this particular implementation, insulation layer 240 is fiberglass batt insulation having a thickness sufficient to provide an insulation value of R-19 or greater (determined per ASTM C 518-17 in accordance with ASTM C-1289-18). As is apparent, in this implementation there is little or no gap G.

It will be appreciated that various other combinations of rigid foam insulation boards have a thickness ranging from 1 inch to 4 inch, including thicknesses of 1 inch, 1½ inch, 2 inch, 2½ inch, 3 inch, 3½ inch, and 4 inch, maybe employed to achieve the required total insulation level, whether it be R-13, R-19, R-30, R-38, or some other value (determined per ASTM C 518-17 in accordance with ASTM C-1289-18).

Figure 3:
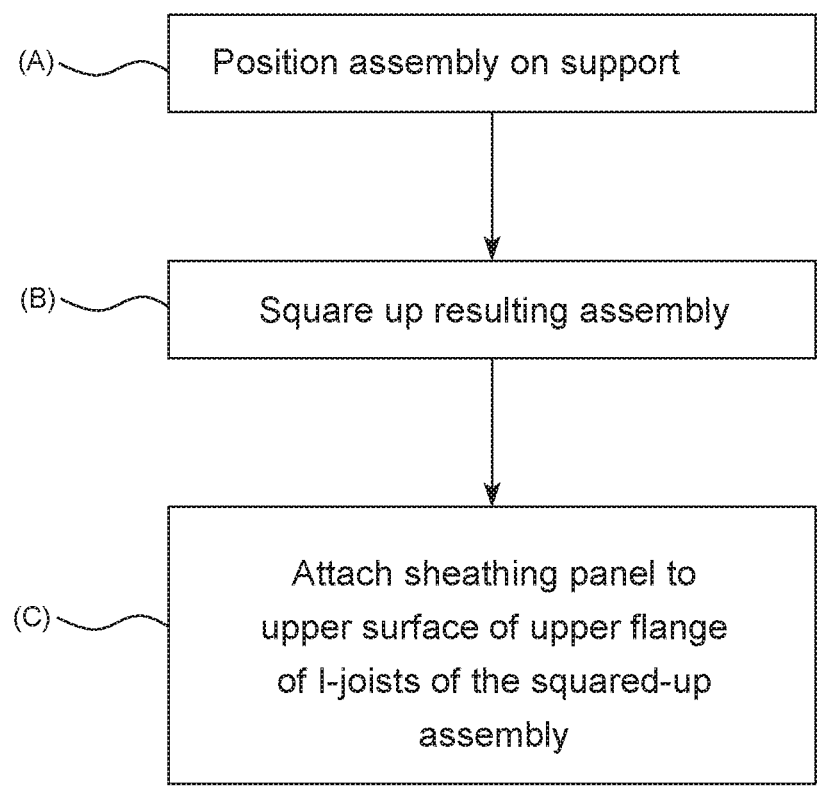
FIG. 3 is a flow chart of a method for making floor assemblies of the present specification.

This specification is also directed to methods for making the floor assemblies described above. Referring now to FIG. 3, the methods comprise (A) positioning an assembly on a support. The assembly comprises: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joists; (iii) the first rigid foam insulation board is positioned between the first I-joist and the second I-joist such that: (1) an outer edge of the first side of the first rigid foam insulation board faces an inner side of the upper flange of the first I-joist, and (3) an outer edge of the second side of the first rigid foam insulation board faces an inner side of the upper flange of the second I-joist; and (iv) the second rigid foam insulation board is positioned between the first I-joist and the second I-joist such that: (1) the upper surface of the second rigid foam insulation board faces the lower surface of the first rigid foam insulation board, (2) the lower surface of the second rigid foam insulation board faces the upper surface of the lower flange of the first I-joist at the first side of the second rigid foam insulation board, (3) the lower surface of the second rigid foam insulation board faces the upper surface of the lower flange of the second I-joist at the second side of the second rigid foam insulation board, (4) an outer edge of the first side of the second rigid foam insulation board faces the web of the first I-joist, and (5) an outer edge of the second side of the second rigid foam insulation board faces the web of the second I-joist; (B) squaring the assembly; and (C) attaching a sheathing panel to the upper surface of the upper flange of the first I-joist and the second I-joist of the squared assembly so that the upper surface of the first rigid foam insulation board abuts the lower surface of the sheathing panel.

As used herein, "generally parallel" means not only that the longest dimension of the I-joists are in an exact parallel relationship to one another but also encompasses situations in which the longest dimension of the I-joists are not in a perfectly parallel relationship, such as where the deviation from perfectly parallel is 10° or less, such as 5° or less, though it will be appreciated that in many cases it may be preferred to minimize such a deviation as much as is practically possible.

A particular implementation of the fabrication method will now be described with reference to FIG. 4. In this implementation, the step of positioning the assembly on the support comprises: (1) placing the first I-joist 400 on the support surface 425; (2) positioning first rigid foam insulation board 450 and second rigid foam insulation board 455 against first I-joist 400 such that: (i) the outer edge of the first side of first rigid foam insulation board 450 faces an inner side of the upper flange of first I-joist 400, (ii) the upper surface of second rigid foam insulation board 455 faces the lower surface of first rigid foam insulation board 450, (iii) the lower surface of second rigid foam insulation board 455 faces the upper surface of the lower flange of first I-joist 400 at the first side of second rigid foam insulation board 455, and (iv) an outer edge of the first side of second rigid foam insulation board 455 faces the web of first I-joist 400; and (3) positioning second I-joist 405 against first rigid foam insulation board 450 and second rigid foam insulation board 455 such that: (i) an outer edge of the second side of first rigid foam insulation board 450 faces an inner side of the upper flange of second I-joist 405, (ii) the lower surface of second rigid foam insulation board 455 faces the upper surface of the lower flange of second I-joist 405 at the second side of second rigid foam insulation board 455, and (iii) an outer edge of second side of the second rigid foam insulation board 455 faces the web of second I-joist 405.

The procedure described in the immediately preceding paragraph may be continued until the desired size of the floor assembly has been achieved. For example, in the particular implementation depicted in FIG. 4, the step of positioning the assembly on the support further comprises: (4) positioning rigid foam insulation board 451 and rigid foam insulation board 456 against I-joist 405 such that: (i) the outer edge of the first side of rigid foam insulation board 451 faces an inner side of the upper flange of I-joist 405, (ii) the upper surface of rigid foam insulation board 456 faces the lower surface of rigid foam insulation board 451, (iii) the lower surface of rigid foam insulation board 456 faces the upper surface of the lower flange of I-joist 405 at the first side of rigid foam insulation board 456, and (iv) an outer edge of the first side of rigid foam insulation board 456 faces the web of I-joist 405; and (5) positioning I-joist 410 against rigid foam insulation board 451 and rigid foam insulation board 456 such that: (i) an outer edge of the second side of rigid foam insulation board 451 faces an inner side of the upper flange of I-joist 410, (ii) the lower surface of rigid foam insulation board 456 faces the upper surface of the lower flange of I-joist 410 at the second side of rigid foam insulation board 456, and (iii) an outer edge of second side of rigid foam insulation board 456 faces the web of I-joist 410; (6) positioning rigid foam insulation board 452 and rigid foam insulation board 457 against I-joist 410 such that: (i) the outer edge of the first side of rigid foam insulation board 452 faces an inner side of the upper flange of I-joist 410, (ii) the upper surface of rigid foam insulation board 457 faces the lower surface of rigid foam insulation board 452, (iii) the lower surface of rigid foam insulation board 457 faces the upper surface of the lower flange of I-joist 410 at the first side of rigid foam insulation board 457, and (iv) an outer edge of the first side of rigid foam insulation board 457 faces the web of I-joist 410; and (7) positioning I-joist 415 against rigid foam insulation board 452 and rigid foam insulation board 557 such that: (i) an outer edge of the second side of rigid foam insulation board 452 faces an inner side of the upper flange of I-joist 415, (ii) the lower surface of rigid foam insulation board 457 faces the upper surface of the lower flange of I-joist 415 at the second side of rigid foam insulation board 457, and (iii) an outer edge of second side of rigid foam insulation board 457 faces the web of I-joist 415; (8) positioning rigid foam insulation board 453 and rigid foam insulation board 458 against I-joist 415 such that: (i) the outer edge of the first side of rigid foam insulation board 453 faces an inner side of the upper flange of I-joist 415, (ii) the upper surface of rigid foam insulation board 458 faces the lower surface of rigid foam insulation board 453, (iii) the lower surface of rigid foam insulation board 458 faces the upper surface of the lower flange of I-joist 415 at the first side of rigid foam insulation board 458, and (iv) an outer edge of the first side of rigid foam insulation board 458 faces the web of I-joist 415; and (9) positioning I-joist 420 against rigid foam insulation board 453 and rigid foam insulation board 458 such that: (i) an outer edge of the second side of rigid foam insulation board 453 faces an inner side of the upper flange of I-joist 420, (ii) the lower surface of rigid foam insulation board 458 faces the upper surface of the lower flange of I-joist 420 at the second side of rigid foam insulation board 458, and (iii) an outer edge of second side of rigid foam insulation board 458 faces the web of I-joist 420.

In some implementations, locator means, such as one or more plates, bars, or pins can be used to maintain proper spacing between I-joists as well as to ensure that the I-joists are kept square. In the particular implementation illustrated in FIG. 4, for example, a combination of intermediate spacing bars 430, 431, and 432, fixed end positioning plate 435, and sliding compression plate 440 are used to ensure proper alignment of the I-joists 400, 405, 410, 415, and 420 in a generally parallel relationship to one another and to ensure proper spacing between I-joists 400, 405, 410, 415, and 420 by placing the respective I-joists against such locator means during fabrication of the assembly.

In some implementations, an adhesive (such as those described earlier) may be applied between the web of the I-joists and the rigid foam insulation boards. By way of illustration, in the particular implementation depicted in FIG. 4, adhesive 445 is applied between the web of I-joists 400 and 405 and outer edges of rigid foam insulation boards 450 and 455, between the web of I-joists 405 and 410 and outer edges of rigid foam insulation boards 451 and 456, between the web of I-joists 410 and 415 and outer edges of rigid foam insulation boards 452 and 457, and between the web of I-joists 415 and 420 and outer edges of rigid foam insulation boards 453 and 458. Such application of adhesive 445 may be accomplished by applying adhesive 445 to I-joist webs prior to insertion of the rigid foam insulation board between I-joists or, alternatively, may be accomplished by applying adhesive to the outer edges of the rigid foam insulation boards prior to their installation, or both. Such adhesive 445 can be applied to the I-joist web before or after the I-joist is placed into position on support surface 425. The use of such an adhesive is believed to add to the structural integrity of the assembly, especially with regard to rollover, while also creating an air barrier between the inside surface of the panels and the exterior.

In some implementations of the fabrication methods described herein, a support may be used to aid in positioning of the first rigid foam insulation board and the second rigid foam insulation board. Referring still to FIG. 4, it is seen that, in this particular implementation, support 460 aids in positioning of first rigid foam insulation board 450 and second rigid foam insulation board 455. First rigid foam insulation board 450 and second rigid foam insulation board 455 may be placed on support 460 either simultaneously or they may be positioned sequentially atop the support 460 (with first rigid foam insulation board 450 lying atop second rigid foam insulation board 455). In some implementations, as shown in the implementation illustrated in FIG. 4, the lower surface of first rigid foam insulation board 450 abuts the upper surface of the second rigid foam insulation board 455 so that rigid foam insulation board 450 is not in a spaced-apart relationship to second rigid foam insulation board 455. In these implementations, an adhesive may be applied where the lower surface of first rigid foam insulation board 450 abuts the upper surface of the second rigid foam insulation board 455. The adhesive may be applied prior to positioning the first rigid foam insulation board 450 and second rigid foam insulation board 455 on support 460 when such rigid foam insulation boards are being positioned simultaneously. When being positioned sequentially, such an adhesive could be applied, for example, to the upper surface of second rigid foam insulation board 455 after such insulation board is positioned on support 460 and prior to positioning of first rigid foam insulation board 450 atop second rigid foam insulation board 455. If it is desired for an air gap to exist between lower surface of first rigid foam insulation board 450 and upper surface of the second rigid foam insulation board so that rigid foam insulation board 450 is in a spaced-apart relationship to second rigid foam insulation board 455, then a spacer, such as a block made of, for example, foam board or wood, or any other appropriate material, may be used.

Figure 4:
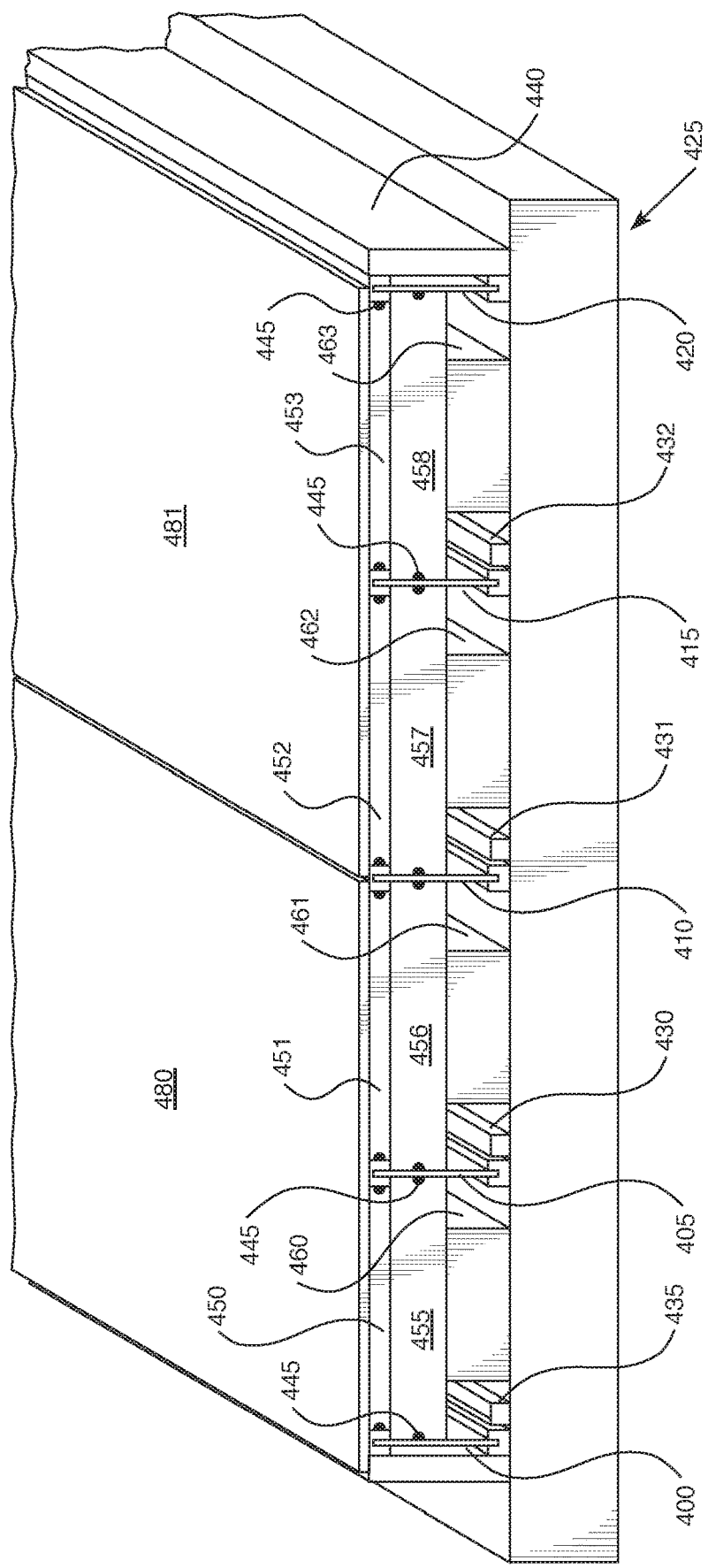
FIG. 4 is a perspective view of a floor assembly placed on a support surface during assembly thereof.

Similarly, in the implementation illustrated in FIG. 4, support 461 aids in positioning of first rigid foam insulation board 451 and second rigid foam insulation board 456, support 462 aids in positioning of first rigid foam insulation board 452 and second rigid foam insulation board 457, and support 463 aids in positioning of first rigid foam insulation board 453 and second rigid foam insulation board 458, each in the manner described earlier with respect to support 460, first rigid foam insulation board 450 and second rigid foam insulation board 455.

In some implementations, the supports can be dimensioned based on the thickness of the rigid foam insulation boards, the height of the I-joists, and the desired distance, if any, between the lower surface of the respective second rigid foam insulation board and the lower surface of the lower flange of the respective I-joist. In some embodiments, the supports are designed to be adjustable in height depending on the thickness of the rigid foam insulation boards being used.

According to the fabrication methods of this specification, (B) the assembly is then squared. According to the depicted implementation of the fabrication method in FIG. 4, when the final assembled sections are in place, an adjustable squaring means, such as a sliding compression plate 440 or sliding bars or pins, which slides in the direction of arrow A, is used to position the end I-joist 420 so as to square up the assembly prior to attaching sheathing panels 480, 481 to the I-joists. The sheathing panels 480, 481 are then (C) attached using an adhesive and/or mechanical fasteners, such as nails, nail plates, screws, staples, bolts, or rivets, or a combination of any thereof, so that the upper surface of a first rigid foam insulation board abuts the lower surface of the sheathing panel. Any of the attachment adhesives can be used if desired. A tape (not shown in FIG. 4) can be used to seal gaps between adjacent sheathing panels 480, 481. If tape is desired to be resistant to water penetration then it will typically conform to the AAMA-711 specification.

As illustrated in the implementation depicted in FIG. 4, adjacent sheathing panels 480, 481 can, if desired, be attached to the I-joists 400, 405, 410, 415, and 420 such that an end of adjacent sheathing panels 480, 481 are attached to the same I-joist. Here, it is seen that sheathing panel 480 is attached to I-joist 400 such that a portion of the sheathing panel 480 extends laterally beyond the edge of upper flange of I-joist 400 and is attached to I-joist 410 such that a portion of the upper flange of I-joist 415 extends laterally beyond the edge of sheathing panel 480. Sheathing panel 481 is attached to I-joist 415 at the portion of the upper flange of I-joist 415 that is not covered by sheathing panel 480, usually with a small gap, such as about ⅛", between sheathing panel 481 and sheathing panel 480, and is attached to I-joist 420 such that a portion of the upper flange of I-joist 415 extends laterally beyond the edge of sheathing panel 481.

Figure 5:
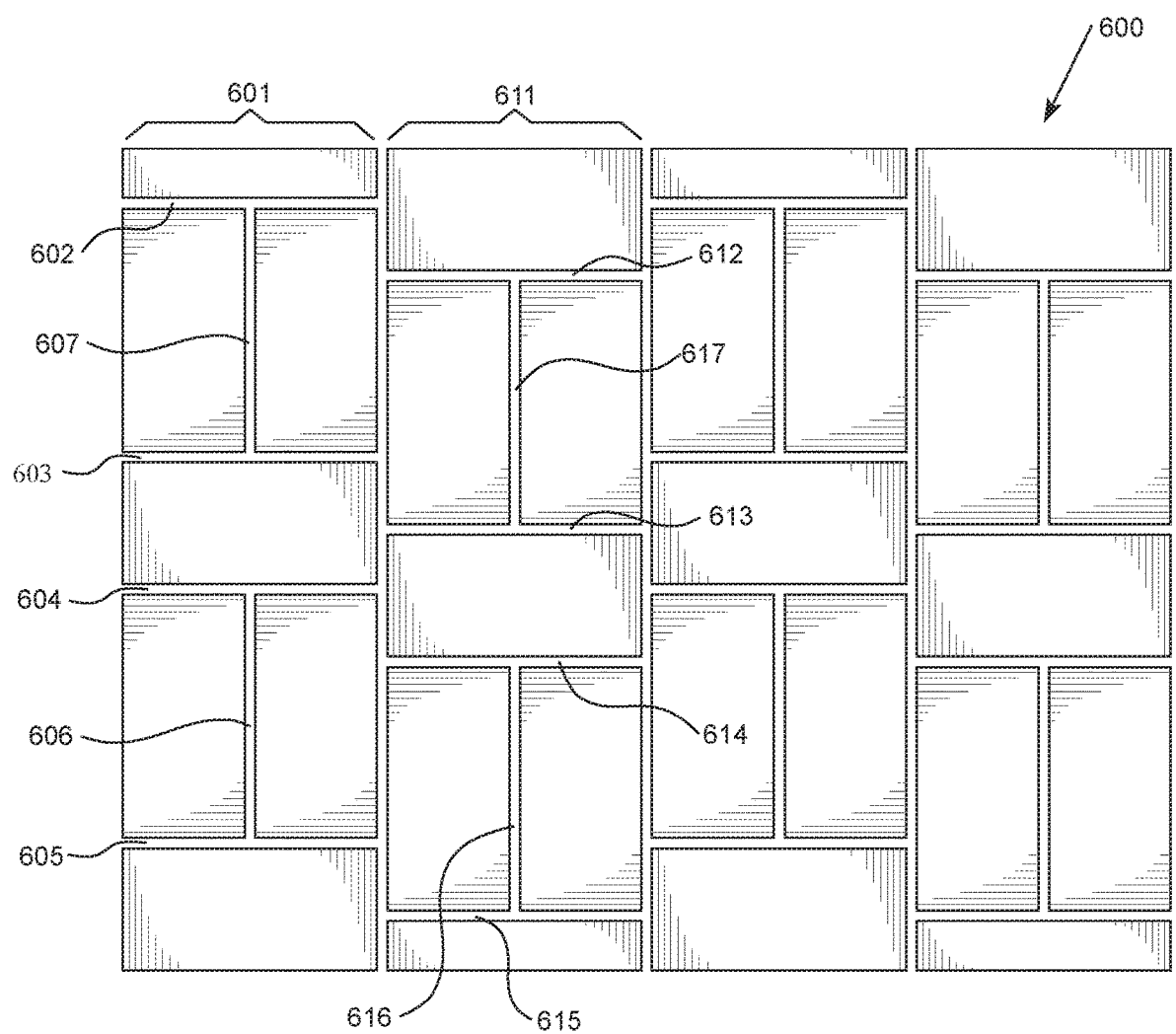
FIG. 5 is a top view of an arrangement of multiple floor panels of the present specification that provides a staggered seem orientation.

Now referring to FIG. 5, it is seen that, in some implementations, the floor assemblies described in this specification may be designed so that seams between sheathing panels may be staggered and may be oriented in different directions. As shown by the top view of FIG. 5, panel 501 of the assembly 500 comprises seams 502, 503, 504, and 505 and seams 506, 507 that are oriented in a direction perpendicular to seams 502, 503, 504, and 505. In addition, seems 512, 513, 514, and 515 on panel 511 are staggered relative to seams 502, 503, 504, and 505 on panel 501 and seams 516, 517 on panel 511 are staggered relative to seams 506, 507 on panel 501. The use of such staggered seams can increase the strength of the roof assembly by eliminating edge-runs.

Figure 6:
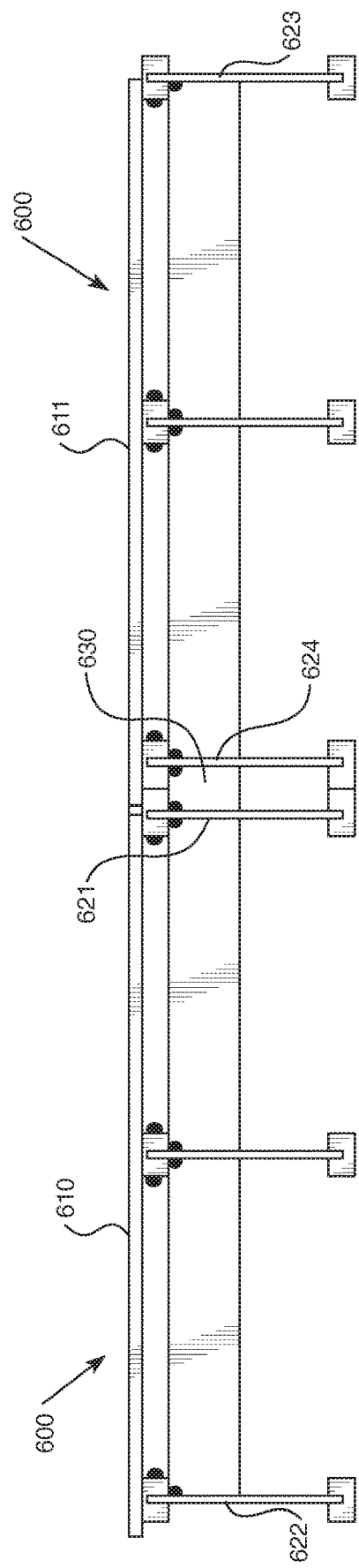
FIG. 6 is a detailed elevational view showing view showing adjacent floor assemblies according to the present specification.

FIG. 6 illustrates, in a detailed elevation view, an arrangement of adjacent floor assemblies 600 of this specification. In the implementation depicted in FIG. 6, the sheathing panels 610, 611 are attached to the I-joists such that an end of adjacent sheathing panels 610, 611 are attached to the same I-joist 621. Here, it is seen that sheathing panel 610 is attached to end I-joist 622 such that a portion of the sheathing panel 610 extends laterally beyond the edge of upper flange of I-joist 622 and is attached to I-joist 621 such that a portion of the upper flange of I-joist 621 extends laterally beyond the edge of sheathing panel 610. Sheathing panel 611 is attached to I-joist 621 at the portion of the upper flange of I-joist 621 that is not covered by sheathing panel 610 and is attached to I-joist 623 such that a portion of the upper flange of I-joist 623 extends laterally beyond the edge of sheathing panel 611. Moreover, sheathing panel 611 is attached to I-joist 624 such that a portion of the sheathing panel 611 extends laterally beyond the edge of upper flange of I-joist 624 so that when the end of sheathing panel 611 is attached to the upper flange of I-joist 621, I-joist 621 and I-joist 624 are in close proximity to each other, and, in some cases, abut one another. If desired, first rigid foam insulation insert 630 and/or second rigid foam insulation insert 631 may be disposed in between adjacent I-joists 621 and 624 so that thermal bridging occurs only through the webs of the I-joists, thereby rendering the assembly a pseudo continuous insulation assembly. First rigid foam insulation insert 630 and/or second rigid foam insulation insert 631 may be any of the rigid foam insulation boards described earlier, or may be another foam material.

Some embodiments of this specification relate to buildings that comprise the floor assemblies described herein. In certain implementation, the flooring assembly is employed as a flooring above an uninsulated basement, a crawlspace or raised piers.

The floor assemblies described above are currently believed to have a combination of advantages that is not present in previous floor assemblies. First, they are capable of efficient prefabrication (such as is described by the fabrication methods discussed in this specification), thereby reducing onsite labor requirements so as to have a low total cost of construction. Such assemblies are constructed so that the rigid foam insulation boards are and will remain in contact with the subfloor. The use of rigid foam insulation boards means that sagging will not occur that would lead to a deterioration in R-value over time. In addition, the rigid foam insulation boards contribute to the structural performance, including rollover strength, of the floor system, and are air and vapor impermeable to reduce the likelihood for condensation of water vapor across the temperature differential of the thermal envelope.

Various aspects of the subject matter described herein are set out in the following numbered clauses:

Clause 1. A prefabricated insulated floor assembly, comprising: (a) a sheathing panel comprising: (1) an upper surface, and (2) a lower surface; (b) a plurality of I-joists positioned in a spaced-apart and generally parallel relationship to each other, the I-joists comprising: (1) an upper flange, (2) a lower flange, and (3) a web extending between the upper flange and the lower flange, wherein the lower surface of the sheathing panel abuts an upper surface of the upper flange of the I-joists so that the sheathing panel and the I-joists define a cavity; (c) a generally planar first rigid foam insulation board comprising: (1) an upper surface, (2) a lower surface, (3) a first side, and (4) a second side that is opposite of the first side, wherein first rigid foam insulation board is positioned in the cavity such that: (1) the upper surface of the first rigid foam insulation board abuts the lower surface of the sheathing panel, (2) an outer edge of the first side of the first rigid foam insulation board faces an inner side of the upper flange of a first I-joist, and (3) an outer edge of the second side of the first rigid foam insulation board faces an inner side of the upper flange of a second I-joist; and (d) a generally planar second rigid foam insulation board comprising: (1) an upper surface, (2) a lower surface, (3) a first side, and (4) a second side that is opposite of the first side, wherein the second rigid foam insulation board is positioned in the cavity such that: (1) the upper surface of the second rigid foam insulation board faces the lower surface of the first rigid foam insulation board, (2) the lower surface of the second rigid foam insulation board faces the upper surface of the lower flange of the first I-joist at the first side of the second rigid foam insulation board, (3) the lower surface of the second rigid foam insulation board faces the upper surface of the lower flange of the second I-joist at the second side of the second rigid foam insulation board, (4) an outer edge of the first side of the second rigid foam insulation board faces the web of the first I-joist, and (5) an outer edge of the second side of the second rigid foam insulation board faces the web of the second I-joist.

Clause 2. The floor assembly of clause 1, wherein the first rigid foam insulation board and the second rigid foam insulation board comprise a polyisocyanurate foam board, an expanded polystyrene foam board, or an extruded polystyrene foam board.

Clause 3. The floor assembly of clause 1 or clause 2, wherein the first rigid foam insulation board and the second rigid foam insulation board comprise a facer material attached to an upper face and/or lower face of a foam layer.

Clause 4. The floor assembly of one of clause 1 to clause 3, wherein the first rigid foam insulation board has a thickness corresponding to a height of a side of the upper flange of the I-joists.

Clause 5. The floor assembly of one of clause 1 to clause 4, wherein the first rigid foam insulation board has a thickness of 1 to 1½ inches.

Clause 6. The floor assembly of one of clause 1 to clause 5, wherein the first rigid foam insulation board comprises a polyisocyanurate foam layer and an aluminum foil or coated glass facer adhered to each side of the polyisocyanurate foam layer.

Clause 7. The floor assembly of one of clause 1 to clause 6, wherein the outer edge of the first side of the first rigid foam insulation board abuts the inner side of the upper flange of a first I-joist and the outer edge of the second side of the first rigid foam insulation board abuts the inner side of the upper flange of a second I-joist, so that the outer edges and are not in a spaced-apart relationship relative to the inner side of the upper flange of the I-joists.

Clause 8. The floor assembly of one of clause 1 to clause 7, wherein the upper surface of the second rigid foam insulation board abuts the lower surface of the first rigid foam insulation board so that first rigid foam insulation board and second rigid foam insulation board are not in a spaced-apart relationship relative to each other.

Clause 9. The floor assembly of one of clause 1 to clause 8, wherein the outer edge of the first side of the second rigid foam insulation board abuts the web of the first I-joist and the outer edge of the second side of the second rigid foam insulation board abuts the web of the second I-joist so that the outer edges are not in a spaced-apart relationship relative to web of the I-joists.

Clause 10. The floor assembly of one of clause 1 to clause 9, wherein the second rigid foam insulation board has a thickness of at least 2 to 4½ inches and comprises a polyisocyanurate foam layer and an aluminum foil, coated glass facer, or glass fiber reinforced foil facer material adhered to each side of the polyisocyanurate foam layer.

Clause 11. The floor assembly of one of clause 1 to clause 10, wherein the second rigid foam insulation board is designed such that, according to IRC Section 2603.9, compliance with the requirements of IRC Sections 2603.4 through 2603.7 is not required and the combined thermal insulating value of the first rigid foam insulation board and the second rigid foam insulation board is at least R-30, determined per ASTM C 518-17 in accordance with ASTM C-1289-18.

Clause 12. A method for making a floor assembly, comprising: (a) positioning an assembly on a support, the assembly comprising: (1) a first I-joist comprising an upper flange, a lower flange, and a web extending between the upper flange and the lower flange, (2) a second I-joist comprising an upper flange, a lower flange, and a web extending between the upper flange and the lower flange, (3) a generally planar first rigid foam insulation board comprising an upper surface, a lower surface, a first side, and a second side that is opposite of the first side, and (4) a generally planar second rigid foam insulation board comprising an upper surface, a lower surface, a first side, and a second side that is opposite of the first side, wherein: (i) the first I-joist and the second I-joist are positioned in a spaced-apart and generally parallel relationship to each other; (ii) the first rigid foam insulation board and the second rigid foam insulation board are positioned between the first I-joist and the second I-joists; (iii) the first rigid foam insulation board is positioned between the first I-joist and the second I-joist such that: (A) an outer edge of the first side of the first rigid foam insulation board faces an inner side of the upper flange of the first I-joist, and (B) an outer edge of the second side of the first rigid foam insulation board faces an inner side of the upper flange of the second I-joist; and (iv) the second rigid foam insulation board is positioned between the first I-joist and the second I-joist such that: (A) the upper surface of the second rigid foam insulation board faces the lower surface of the first rigid foam insulation board, (B) the lower surface of the second rigid foam insulation board faces the upper surface of the lower flange of the first I-joist at the first side of the second rigid foam insulation board, (C) the lower surface of the second rigid foam insulation board faces the upper surface of the lower flange of the second I-joist at the second side of the second rigid foam insulation board, (D) an outer edge of the first side of the second rigid foam insulation board faces the web of the first I-joist, and (E) an outer edge of the second side of the second rigid foam insulation board faces the web of the second I-joist; (b) squaring the assembly; and (c) attaching a sheathing panel to the upper surface of the upper flange of the first I-joist and the second I-joist of the squared assembly so that the upper surface of the first rigid foam insulation board abuts the lower surface of the sheathing panel.

Clause 13. The method of clause 12, wherein the step of positioning the assembly on the support comprises: (1) placing the first I-joist on the support surface; (2) positioning the first rigid foam insulation board and the second rigid foam insulation board against the first I-joist such that: (i) the outer edge of the first side of the first rigid foam insulation board faces the inner side of the upper flange of the first I-joist, (ii) the upper surface of the second rigid foam insulation board faces the lower surface of the first rigid foam insulation board, (iii) the lower surface of second rigid foam insulation board faces the upper surface of the lower flange of the first I-joist at the first side of the second rigid foam insulation board, and (iv) the outer edge of the first side of the second rigid foam insulation board faces the web of the first I-joist; and (3) positioning the second I-joist against the first rigid foam insulation board and the second rigid foam insulation board such that: (i) the outer edge of the second side of the first rigid foam insulation board faces the inner side of the upper flange of the second I-joist, (ii) the lower surface of the second rigid foam insulation board faces the upper surface of the lower flange of the second I-joist at the second side of the second rigid foam insulation board, and (iii) the outer edge of the second side of the second rigid foam insulation board faces the web of the second I-joist.

Clause 14. The method of clause 13, wherein a support is used to aid in positioning of the first rigid foam insulation board and the second rigid foam insulation board.

Clause 15. The method of one of clause 12 to clause 14, wherein an adjustable squaring means is used to square up the assembly.

Clause 16. The method of one of clause 12 to clause 15, wherein the first rigid foam insulation board and the second rigid foam insulation board comprise a polyisocyanurate foam board, an expanded polystyrene foam board, or an extruded polystyrene foam board.

Clause 17. The method of one of clause 12 to clause 16, wherein the first rigid foam insulation board and the second rigid foam insulation board comprise a facer material attached to an upper face and/or lower face of a foam layer.

Clause 18. The method of one of clause 12 to clause 17, wherein the first rigid foam insulation board has a thickness corresponding to a height of a side of the upper flange of the I-joists.

Clause 19. The method of one of clause 12 to clause 18, wherein the first rigid foam insulation board has a thickness of 1 to 1½ inches and comprises a polyisocyanurate foam layer and an aluminum foil or coated glass facer adhered to each side of the polyisocyanurate foam layer and the second rigid foam insulation board has a thickness of at least 2 to 4½ inches and comprises a polyisocyanurate foam layer and an aluminum foil, coated glass facer, or glass fiber reinforced foil facer material adhered to each side of the polyisocyanurate foam layer.

Clause 20. A building comprising the floor assembly of one of clause 1 to clause 11 above an uninsulated basement, a crawlspace or raised piers, or a building comprising a floor assembly made by a method of one of clause 12 to clause 19 above an uninsulated basement, a crawlspace, or raised piers.

Various features and characteristics of the inventions are described in this specification to provide an overall understanding of the disclosed wall structures and method of manufacture. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. § 112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§ 112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A floor assembly, comprising:
    (a) a sheathing panel comprising:
        (1) an upper surface, and
        (2) a lower surface;
    (b) a plurality of I-joists positioned in a spaced-apart and generally parallel relationship to each other, the I-joists comprising:
        (1) an upper flange,
        (2) a lower flange, and
        (3) a web extending between the upper flange and the lower flange,
    wherein the lower surface of the sheathing panel abuts an upper surface of the upper flange of the I-joists so that the sheathing panel and the I-joists define a cavity;
    (c) a generally planar first rigid foam insulation board comprising:
        (1) an upper surface,
        (2) a lower surface,
        (3) a first side, and
        (4) a second side that is opposite of the first side,
    wherein first rigid foam insulation board is positioned in the cavity such that:
        (1) the upper surface of the first rigid foam insulation board abuts the lower surface of the sheathing panel,
        (2) an outer edge of the first side of the first rigid foam insulation board faces an inner side of the upper flange of a first I-joist, and
        (3) an outer edge of the second side of the first rigid foam insulation board faces an inner side of the upper flange of a second I-joist; and
    (d) a generally planar second rigid foam insulation board comprising:
        (1) an upper surface,
        (2) a lower surface,
        (3) a first side, and
        (4) a second side that is opposite of the first side,
    wherein the second rigid foam insulation board is positioned in the cavity such that:
        (1) the upper surface of the second rigid foam insulation board faces the lower surface of the first rigid foam insulation board,
        (2) the lower surface of the second rigid foam insulation board faces the upper surface of the lower flange of the first I-joist at the first side of the second rigid foam insulation board,
        (3) the lower surface of the second rigid foam insulation board faces the upper surface of the lower flange of the second I-joist at the second side of the second rigid foam insulation board,
        (4) an outer edge of the first side of the second rigid foam insulation board faces the web of the first I-joist, and
        (5) an outer edge of the second side of the second rigid foam insulation board faces the web of the second I-joist,
    wherein the first rigid foam insulation board has a thickness that is substantially the same as the height of the inner side of the upper flange of the first I-joist and to the height of the inner side of the upper flange of the second I-joist.

2. The floor assembly of claim 1, wherein the first rigid foam insulation board and the second rigid foam insulation board comprise a polyisocyanurate foam board, an expanded polystyrene foam board, or an extruded polystyrene foam board.

3. The floor assembly of claim 2, wherein the first rigid foam insulation board and the second rigid foam insulation board comprise a facer material attached to an upper face and/or lower face of a foam layer.

4. The floor assembly of claim 1, wherein the first rigid foam insulation board has a thickness of 1 to 1½ inches.

5. The floor assembly of claim 4, wherein the first rigid foam insulation board comprises a polyisocyanurate foam layer and an aluminum foil or coated glass facer adhered to each side of the polyisocyanurate foam layer.

6. The floor assembly of claim 1, wherein the outer edge of the first side of the first rigid foam insulation board abuts the inner side of the upper flange of a first I-joist and the outer edge of the second side of the first rigid foam insulation board abuts the inner side of the upper flange of a second I-joist, so that the outer edges and are not in a spaced-apart relationship relative to the inner side of the upper flange of the first I-joist and the second I-joist.

7. The floor assembly of claim 6, wherein the upper surface of the second rigid foam insulation board abuts the lower surface of the first rigid foam insulation board so that first rigid foam insulation board and second rigid foam insulation board are not in a spaced-apart relationship relative to each other.

8. The floor assembly of claim 7, wherein the outer edge of the first side of the second rigid foam insulation board abuts the web of the first I-joist and the outer edge of the second side of the second rigid foam insulation board abuts the web of the second I-joist so that the outer edges are not in a spaced-apart relationship relative to web of the first I-joist and the second I-joist.

9. The floor assembly of claim 5, wherein the second rigid foam insulation board has a thickness of at least 2 to 4½ inches and comprises a polyisocyanurate foam layer and an aluminum foil, coated glass facer, or glass fiber reinforced foil facer material adhered to each side of the polyisocyanurate foam layer.

10. The floor assembly of claim 1, wherein the second rigid foam insulation board is designed such that, according to IRC Section 2603.9, compliance with the requirements of IRC Sections 2603.4 through 2603.7 is not required and the combined thermal insulating value of the first rigid foam insulation board and the second rigid foam insulation board is at least R-30, determined per ASTM C 518-17 in accordance with ASTM C-1289-18.

11. A building comprising the floor assembly of claim 1 above an uninsulated basement, a crawlspace or raised piers.

12. A method for making a floor assembly, comprising:
    (a) positioning an assembly on a support, the assembly comprising:

(1) a first I-joist comprising an upper flange, a lower flange, and a web extending between the upper flange and the lower flange,
(2) a second I-joist comprising an upper flange, a lower flange, and a web extending between the upper flange and the lower flange,
(3) a generally planar first rigid foam insulation board comprising an upper surface, a lower surface, a first side, and a second side that is opposite of the first side, and
(4) a generally planar second rigid foam insulation board comprising an upper surface, a lower surface, a first side, and a second side that is opposite of the first side, wherein:
 (i) the first I-joist and the second I-joist are positioned in a spaced-apart and generally parallel relationship to each other;
 (ii) the first rigid foam insulation board and the second rigid foam insulation board are positioned between the first I-joist and the second I-joists;
 (iii) the first rigid foam insulation board is positioned between the first I-joist and the second I-joist such that:
  (A) an outer edge of the first side of the first rigid foam insulation board faces an inner side of the upper flange of the first I-joist, and
  (B) an outer edge of the second side of the first rigid foam insulation board faces an inner side of the upper flange of the second I-joist; and
 (iv) the second rigid foam insulation board is positioned between the first I-joist and the second I-joist such that:
  (A) the upper surface of the second rigid foam insulation board faces the lower surface of the first rigid foam insulation board,
  (B) the lower surface of the second rigid foam insulation board faces the upper surface of the lower flange of the first I-joist at the first side of the second rigid foam insulation board,
  (C) the lower surface of the second rigid foam insulation board faces the upper surface of the lower flange of the second I-joist at the second side of the second rigid foam insulation board,
  (D) an outer edge of the first side of the second rigid foam insulation board faces the web of the first I-joist, and
  (E) an outer edge of the second side of the second rigid foam insulation board faces the web of the second I-joist;
(b) squaring the assembly; and
(c) attaching a sheathing panel to the upper surface of the upper flange of the first I-joist and the second I-joist of the squared assembly so that the upper surface of the first rigid foam insulation board abuts the lower surface of the sheathing panel,
wherein the first rigid foam insulation board has a thickness that is substantially the same as the height of the inner side of the upper flange of the first I-joist and to the height of the inner side of the upper flange of the second I-joist.

13. The method of claim 12, wherein the step of positioning the assembly on the support comprises:
 (1) placing the first I-joist on a surface of the support;
 (2) positioning the first rigid foam insulation board and the second rigid foam insulation board against the first I-joist such that:
  (i) the outer edge of the first side of the first rigid foam insulation board faces the inner side of the upper flange of the first I-joist,
  (ii) the upper surface of the second rigid foam insulation board faces the lower surface of the first rigid foam insulation board,
  (iii) the lower surface of second rigid foam insulation board faces the upper surface of the lower flange of the first I-joist at the first side of the second rigid foam insulation board, and
  (iv) the outer edge of the first side of the second rigid foam insulation board faces the web of the first I-joist; and
 (3) positioning the second I-joist against the first rigid foam insulation board and the second rigid foam insulation board such that:
  (i) the outer edge of the second side of the first rigid foam insulation board faces the inner side of the upper flange of the second I-joist,
  (ii) the lower surface of the second rigid foam insulation board faces the upper surface of the lower flange of the second I-joist at the second side of the second rigid foam insulation board, and
  (iii) the outer edge of the second side of the second rigid foam insulation board faces the web of the second I-joist.

14. The method of claim 13, wherein a second support is used to aid in positioning of the first rigid foam insulation board and the second rigid foam insulation board.

15. The method of claim 13, wherein an adjustable squaring means is used to square up the assembly.

16. The method of claim 12, wherein the first rigid foam insulation board and the second rigid foam insulation board comprise a polyisocyanurate foam board, an expanded polystyrene foam board, or an extruded polystyrene foam board.

17. The method of claim 16, wherein the first rigid foam insulation board and the second rigid foam insulation board comprise a facer material attached to an upper face and/or lower face of a foam layer.

18. The method of claim 12, wherein the first rigid foam insulation board has a thickness of 1 to 1½ inches and comprises a polyisocyanurate foam layer and an aluminum foil or coated glass facer adhered to each side of the polyisocyanurate foam layer and the second rigid foam insulation board has a thickness of at least 2 to 4½ inches and comprises a polyisocyanurate foam layer and an aluminum foil, coated glass facer, or glass fiber reinforced foil facer material adhered to each side of the polyisocyanurate foam layer.

* * * * *